US009305108B2

(12) United States Patent (10) Patent No.: US 9,305,108 B2
Nordstrom et al. (45) Date of Patent: Apr. 5, 2016

(54) SEMANTIC SELECTION AND PURPOSE FACILITATION

(71) Applicant: GOOGLE INC., Mountain View, CA (US)

(72) Inventors: Paul Nordstrom, San Francisco, CA (US); Casey Stuart Whitelaw, Paris (FR)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 13/646,628

(22) Filed: Oct. 5, 2012

(65) Prior Publication Data

US 2013/0091463 A1 Apr. 11, 2013

Related U.S. Application Data

(60) Provisional application No. 61/543,752, filed on Oct. 5, 2011, provisional application No. 61/586,656, filed on Jan. 13, 2012.

(51) Int. Cl.
*G06F 3/0482* (2013.01)
*G06F 17/30* (2006.01)
*G06Q 30/02* (2012.01)

(52) U.S. Cl.
CPC .......... *G06F 17/30905* (2013.01); *G06Q 30/02* (2013.01)

(58) Field of Classification Search
None
See application file for complete search history.

(56) References Cited

U.S. PATENT DOCUMENTS

| 5,471,578 | A | 11/1995 | Moran et al. |
| 5,948,040 | A | 9/1999 | DeLorme et al. |
| 6,018,738 | A | * 1/2000 | Breese et al. ................. 707/749 |
| 6,262,735 | B1 | * 7/2001 | Etelapera ...................... 715/854 |
| 6,549,768 | B1 | 4/2003 | Fraccaroli |
| 6,766,456 | B1 | 7/2004 | McKeeth |
| 6,928,425 | B2 | 8/2005 | Grefenstette et al. |
| 7,178,720 | B1 | * 2/2007 | Strubbe et al. ................ 235/375 |
| 7,299,424 | B2 | 11/2007 | Jarrett et al. |
| 7,376,658 | B1 | 5/2008 | Bumgarner et al. |
| 7,574,675 | B1 | 8/2009 | Linker et al. |

(Continued)

FOREIGN PATENT DOCUMENTS

EP 2464138 A1 6/2012

OTHER PUBLICATIONS

Wang, et al., "Effective personalized recommendation based on time-framed navigation clustering and association mining", Expert Systems with Applications, Oct. 2004, pp. 365-367, vol. 27, Issue 3.

(Continued)

*Primary Examiner* — Phenuel Salomon
(74) *Attorney, Agent, or Firm* — McDermott Will & Emery LLP

(57) ABSTRACT

Computer-implemented methods for proposing actions to a user to select based on the user's predicted purpose for selecting content are provided. In one aspect, a method includes receiving an identifier of a referent entity associated with user-selectable content, identifying, based on a prediction of a purpose in selecting the content, at least one action to be executed that is associated with the entity, and providing, for display, at least one identifier of the at least one action to the device for selection by a user. Systems, graphical user interfaces, and machine-readable media are also provided.

17 Claims, 7 Drawing Sheets

(56) References Cited

U.S. PATENT DOCUMENTS

| | | | |
|---|---|---|---|
| 8,005,643 B2 | 8/2011 | Tunkelang et al. | |
| 8,005,842 B1 | 8/2011 | Pasca et al. | |
| 8,010,545 B2 | 8/2011 | Stefik et al. | |
| 8,219,557 B2 | 7/2012 | Grefenstette et al. | |
| 8,255,830 B2 | 8/2012 | Ording et al. | |
| 8,412,166 B2 | 4/2013 | Ellanti et al. | |
| 8,522,156 B2* | 8/2013 | Kumagai et al. | 715/780 |
| 8,543,570 B1 | 9/2013 | Cramer | |
| 8,676,232 B2 | 3/2014 | Bychkov et al. | |
| 2002/0035581 A1* | 3/2002 | Reynar et al. | 707/513 |
| 2003/0004909 A1 | 1/2003 | Chauhan | |
| 2003/0013951 A1 | 1/2003 | Stefanescu et al. | |
| 2003/0061201 A1 | 3/2003 | Grefenstette et al. | |
| 2005/0071479 A1 | 3/2005 | Achlioptas | |
| 2005/0198591 A1 | 9/2005 | Jarrett et al. | |
| 2005/0283468 A1 | 12/2005 | Kamvar et al. | |
| 2006/0184473 A1 | 8/2006 | Eder | |
| 2006/0195442 A1* | 8/2006 | Cone et al. | 707/5 |
| 2007/0016553 A1* | 1/2007 | Dumais et al. | 707/2 |
| 2007/0050253 A1 | 3/2007 | Biggs et al. | |
| 2007/0106468 A1 | 5/2007 | Eichenbaum et al. | |
| 2007/0106497 A1* | 5/2007 | Ramsey et al. | 704/9 |
| 2007/0115264 A1 | 5/2007 | Yu et al. | |
| 2007/0192794 A1 | 8/2007 | Curtis et al. | |
| 2007/0203906 A1 | 8/2007 | Cone et al. | |
| 2008/0086356 A1 | 4/2008 | Glassman et al. | |
| 2008/0088886 A1 | 4/2008 | Silverbrook et al. | |
| 2008/0109473 A1* | 5/2008 | Dixon et al. | 707/102 |
| 2008/0134101 A1 | 6/2008 | Newman | |
| 2008/0140643 A1 | 6/2008 | Ismalon | |
| 2008/0250026 A1 | 10/2008 | Linden et al. | |
| 2009/0019028 A1 | 1/2009 | Norris et al. | |
| 2009/0070326 A1 | 3/2009 | Kraft | |
| 2009/0150388 A1 | 6/2009 | Roseman et al. | |
| 2009/0157523 A1 | 6/2009 | Jones et al. | |
| 2009/0164929 A1 | 6/2009 | Chen et al. | |
| 2009/0216696 A1 | 8/2009 | Downs et al. | |
| 2009/0217149 A1* | 8/2009 | Kamien et al. | 715/230 |
| 2009/0287680 A1 | 11/2009 | Paek et al. | |
| 2010/0082611 A1* | 4/2010 | Athsani et al. | 707/724 |
| 2010/0106603 A1 | 4/2010 | Dey et al. | |
| 2010/0153440 A1 | 6/2010 | Hubert | |
| 2010/0161658 A1 | 6/2010 | Hamynen et al. | |
| 2010/0225470 A1 | 9/2010 | Marwah et al. | |
| 2010/0241649 A1 | 9/2010 | Lewak et al. | |
| 2010/0248744 A1 | 9/2010 | Bychkov et al. | |
| 2010/0251169 A1 | 9/2010 | Kimchi et al. | |
| 2010/0293179 A1 | 11/2010 | Chaudhuri et al. | |
| 2010/0312769 A1 | 12/2010 | Bailey et al. | |
| 2010/0332583 A1 | 12/2010 | Szabo | |
| 2011/0010352 A1 | 1/2011 | Jockisch et al. | |
| 2011/0010669 A1 | 1/2011 | Basu et al. | |
| 2011/0015996 A1 | 1/2011 | Kassoway et al. | |
| 2011/0016375 A1 | 1/2011 | Ramic et al. | |
| 2011/0016421 A1 | 1/2011 | Krupka et al. | |
| 2011/0022292 A1 | 1/2011 | Shen et al. | |
| 2011/0029443 A1 | 2/2011 | King et al. | |
| 2011/0029467 A1 | 2/2011 | Spehr et al. | |
| 2011/0035406 A1 | 2/2011 | Petrou et al. | |
| 2011/0035662 A1 | 2/2011 | King et al. | |
| 2011/0043652 A1 | 2/2011 | King et al. | |
| 2011/0060744 A1 | 3/2011 | Brignull et al. | |
| 2011/0070872 A1 | 3/2011 | Ellanti et al. | |
| 2011/0072033 A1 | 3/2011 | White et al. | |
| 2011/0078208 A1* | 3/2011 | Arseneault | 707/802 |
| 2011/0078597 A1 | 3/2011 | Rapp et al. | |
| 2011/0113349 A1 | 5/2011 | Kiciman et al. | |
| 2011/0119291 A1 | 5/2011 | Rice | |
| 2011/0125734 A1 | 5/2011 | Duboue et al. | |
| 2011/0125735 A1 | 5/2011 | Petrou | |
| 2011/0131241 A1 | 6/2011 | Petrou et al. | |
| 2011/0131244 A1 | 6/2011 | Padovitz et al. | |
| 2011/0137895 A1 | 6/2011 | Petrou et al. | |
| 2011/0137989 A1 | 6/2011 | Kiciman et al. | |
| 2011/0153639 A1 | 6/2011 | Christensen et al. | |
| 2011/0153653 A1 | 6/2011 | King et al. | |
| 2011/0167357 A1 | 7/2011 | Benjamin et al. | |
| 2011/0173217 A1* | 7/2011 | Kasperski | 707/767 |
| 2011/0179387 A1 | 7/2011 | Shaffer et al. | |
| 2011/0184827 A1 | 7/2011 | Hubert | |
| 2011/0184960 A1 | 7/2011 | Delpha et al. | |
| 2011/0191122 A1 | 8/2011 | Kharraz Tavakol et al. | |
| 2011/0191662 A1 | 8/2011 | Poteet, II et al. | |
| 2011/0195726 A1* | 8/2011 | Horvitz et al. | 455/456.3 |
| 2011/0208730 A1 | 8/2011 | Jiang et al. | |
| 2011/0208801 A1* | 8/2011 | Thorkelsson et al. | 709/203 |
| 2011/0208822 A1 | 8/2011 | Rathod | |
| 2011/0231382 A1 | 9/2011 | Xu | |
| 2011/0231796 A1 | 9/2011 | Vigil | |
| 2011/0264530 A1 | 10/2011 | Santangelo et al. | |
| 2011/0282888 A1 | 11/2011 | Koperski et al. | |
| 2011/0289153 A1 | 11/2011 | Hull et al. | |
| 2011/0302155 A1 | 12/2011 | Yan et al. | |
| 2012/0047461 A1 | 2/2012 | Colvin et al. | |
| 2012/0095984 A1 | 4/2012 | Wren-Hilton et al. | |
| 2012/0102437 A1 | 4/2012 | Worley et al. | |
| 2012/0123674 A1* | 5/2012 | Perks et al. | 701/426 |
| 2012/0136689 A1 | 5/2012 | Ickman et al. | |
| 2012/0166452 A1 | 6/2012 | Tseng | |
| 2012/0197857 A1 | 8/2012 | Huang et al. | |
| 2012/0210240 A1* | 8/2012 | Neystadt et al. | 715/739 |
| 2012/0215791 A1* | 8/2012 | Malik et al. | 707/749 |
| 2012/0265779 A1 | 10/2012 | Hsu et al. | |
| 2012/0310771 A1 | 12/2012 | Selinger et al. | |
| 2013/0085843 A1 | 4/2013 | Dyor et al. | |
| 2013/0091463 A1 | 4/2013 | Nordstrom et al. | |
| 2013/0205244 A1 | 8/2013 | Decker et al. | |
| 2013/0212102 A1 | 8/2013 | Simeoni et al. | |
| 2013/0297591 A1 | 11/2013 | Seefeld et al. | |
| 2013/0321402 A1 | 12/2013 | Moore et al. | |
| 2013/0325343 A1 | 12/2013 | Blumenberg et al. | |
| 2014/0101606 A1 | 4/2014 | Albrecht et al. | |
| 2014/0108037 A1 | 4/2014 | Plummer et al. | |
| 2014/0331176 A1 | 11/2014 | Cheng | |
| 2014/0337791 A1 | 11/2014 | Agnetta et al. | |
| 2014/0359510 A1 | 12/2014 | Graf et al. | |
| 2014/0365126 A1 | 12/2014 | Vulcano et al. | |
| 2015/0127640 A1 | 5/2015 | Nordstrom et al. | |
| 2015/0154214 A1 | 6/2015 | Nordstrom et al. | |

OTHER PUBLICATIONS

Zhang, et al., "Efficient Hybrid Web Recommendations Based on Markov Clickstream Models and Implicit Search", IEEE/WIC/ACM International Conference on Web Intelligence, Nov. 2-5, 2007, pp. 621-627.

Wang, et al., "An Effective Content-based Recommendation Method for Web Browsing Based on Keyword Context Matching", Journal of Informatics & Electronics, Oct. 2006, pp. 49-59, vol. 1, No. 2.

Lowensohn, "Microsoft skips Apple's copy, paste with Bing 'Lasso'", CNET News, Jul. 5, 2011, retrieved from <http://news.cnetcom/8301-27076_3-20076888-248/microsoft-skips-apples-copy-paste-with-bing-lasso/>.

"Semantic Web", Wikipedia, the free encyclopedia, last modified on Aug. 21, 2012, retrieved from <http://en.wikipedia.org/wiki/Semantic_Web>.

Tian, "iOS Tutorial: Copy and Paste Text", iTracki, Jul. 12, 2011, retrieved from <http://itracki.com/timeless/ios-tutorial-copy-paste-text/>.

"Search advertising", Wikipedia, the free encyclopedia, last modified Jun. 29, 2012, retrieved from <http://en.wikipedia.org/wiki/Search_advertising>.

* cited by examiner

FIG. 4A

SEMANTIC SELECTION AND PURPOSE FACILITATION

CROSS-REFERENCE TO RELATED APPLICATIONS

The present application claims the benefit of priority under 35 U.S.C. §119 from U.S. Provisional Patent Application Ser. No. 61/543,752 entitled "Referent Determination From Selected Content," filed on Oct. 5, 2011, and U.S. Provisional Patent Application Ser. No. 61/586,656 entitled "Semantic Selection and Purpose Facilitation," filed on Jan. 13, 2012, the disclosures of which are hereby incorporated by reference in their entirety for all purposes.

BACKGROUND

1. Field

The present disclosure generally relates to the transmission of data over a network, and more particularly to the use of a computing device to identify data communicated over a network.

2. Description of the Related Art

Users often want to perform certain actions using content, such as text and images, displayed on their devices. For example, if a user is viewing a web page describing a restaurant, the user may want to create a reservation at the restaurant or obtain directions to the restaurant from the user's current location. Facilitating the user's purpose (e.g., to create a reservation or obtain directions) usually requires the user to perform several input actions with the device. For example, for making a reservation at a restaurant, a user must properly select the name of the restaurant displayed on screen, copy the selected content, paste the select content into a search query, submit the search query, select the restaurant's web site from the search results, determine if the user can make a reservation on the web site, and then provide information for the reservation. With touchscreen devices, such as desktop or mobile devices with touch input, facilitating the user's purpose is especially cumbersome because the user is often limited to touch input.

SUMMARY

According to one embodiment of the present disclosure, a computer-implemented method for proposing actions to a user to select based on the user's predicted purpose for selecting content is provided. The method includes receiving an identifier of a referent entity from a device, the referent entity selected from a list of suggested entities identified from user-selectable content displayed on the device, and identifying at least one action to be executed that is associated with the referent entity based on a context in which the referent entity is selected by a user from the list of suggested entities. The method also includes providing, for display, at least one identifier of the at least one action to the device for selection by the user.

According to another embodiment of the present disclosure, a system for proposing actions to a user to select based on the user's predicted purpose for selecting content is provided. The system includes a memory that includes user-selectable content, and a processor. The processor is configured to receive an identifier of a referent entity from a device, the referent entity selected from a list of suggested entities identified from user-selectable content displayed on the device, and identify at least one action to be executed that is associated with the referent entity based on a context in which the referent entity is selected by a user from the list of suggested entities. The processor is also configured to provide, for display, at least one identifier of the at least one action to the device for selection by the user. The at least one action is selected from a list of actions associated with the referent entity.

According to a further embodiment of the present disclosure, a graphical user interface for proposing actions to a user to select based on the user's predicted purpose for selecting content is provided. The graphical user interface includes a content selection interface configured to receive, from a device, an identifier of a referent entity selected from a list of suggested entities identified from user-selectable content displayed on the device, and an action selection interface configured to identify at least one action to be executed that is associated with the referent entity based on a context in which the referent entity is selected by a user from the list of suggested entities, and provide, for display, at least one identifier of the at least one action to the device for selection by the user.

According to yet a further embodiment of the present disclosure, a machine-readable storage medium includes machine-readable instructions for causing a processor to execute a method for proposing actions to a user to select based on the user's predicted purpose for selecting content is provided. The method includes receiving an identifier of a referent entity from a device, the referent entity selected by a user from a list of suggested entities identified from user-selectable content displayed on the device, and identifying at least one action, from a list of actions associated with the referent entity, to be executed based on at least one of a current location of the device, a past location of the device, the type of the device, a previous action associated with the referent entity taken by the user or another user, a search query, information on another user associated with the user, the file from which the user-selectable content was selected, and the remaining content from which the user-selectable content was selected. The method also includes providing, for display, at least one identifier of the at least one action to the device for selection by the user.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4D are example screenshots associated with the example process of FIG. 3.

DETAILED DESCRIPTION

Figure 1:
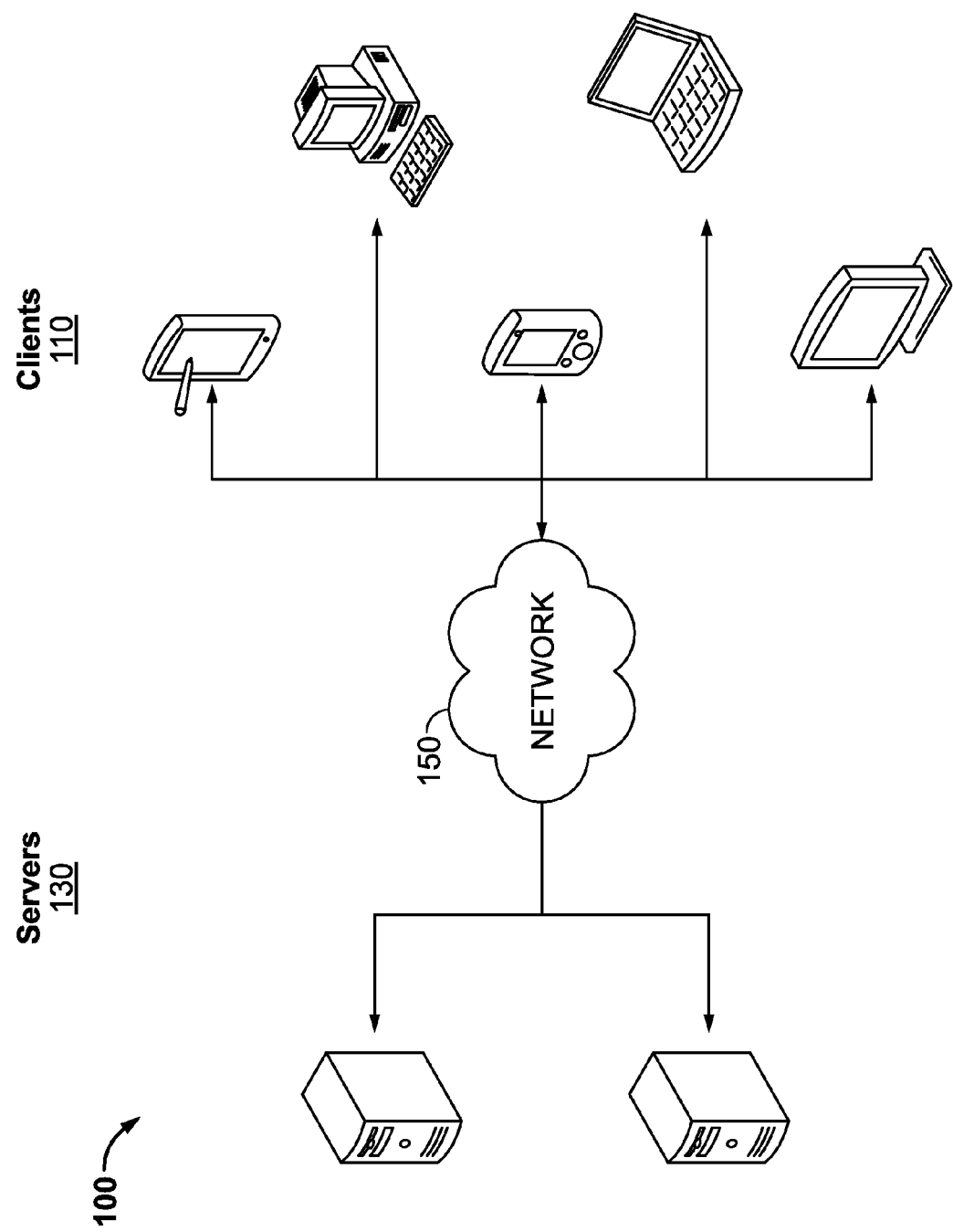
FIG. 1 illustrates an example architecture for identifying an entity based on selected content.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system allows a user to select content displayed on a touchscreen using a touch input, and then certain actions associated with the selected content are predicted and presented for the user to select in order for the user to achieve the user's intended purpose for the selection. The actions are predicted based on the user's intended object of the selection (the "referent" or "referent entity"). For example, a user viewing a web page describing a restaurant might be directed to the web page from a web search for "sushi restaurants in Mountain View." The user then selects the text "we love Ramen Sushi out of all of the places we've been to" on the web page by circling the text using a touch input. Based on the selected content and a context in which the content was selected from a file, the disclosed system determines that the referent of the selected text is Ramen Sushi, and proposes the referent to the user. When the user confirms (e.g., through selection) the referent Ramen Sushi, the user is provided with various actions to perform on the referent based on a context in which the user selected the referent. The context of the selection used to identify the actions can include a current location of the device, a past location of the device, the type of the device, a previous action associated with the entity taken by the user or another user, a search query, information on another user associated with the user, the file from which the user-selectable content was selected, or the remaining content from which the user-selectable content was selected. The actions of "directions to Ramen Sushi," "make a reservation at Ramen Sushi," "operating hours for Ramen Sushi," and "reviews of Ramen Sushi," are then displayed for the user to select from. Once selected, the actions can be automatically performed by the disclosed system.

Although many examples provided herein describe a user's information (e.g., user selections and other actions) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). The user information does not include and/or share the specific identification of the user (e.g., the user's name) unless otherwise specifically provided or directed by the user.

FIG. 1 illustrates an example architecture 100 for identifying an entity based on selected content. The architecture 100 includes servers 130 and clients 110 connected over a network 150.

One of the many servers 130 is configured to host an entity database. For purposes of load balancing, multiple servers 130 can host the entity database (or portions thereof). As discussed herein, the entity database receives a copy of content selected by a user of one of the clients 110, and then identifies at least one entity from the entity database that is being referred to in the selected content. The entity being referred to in the selected content (i.e., the "referent entity" or "referent") can be identified, for example, by identifying one or many entities appearing in the selected content or inferred from the selected content (e.g., using a context in which the content is selected), and comparing the identified entities or other related entities to entities in the entity database, along with a context in which the content was selected. The context can be based on, for example, a current or past location of the client 110, a previous use of the selected content by the user or another user, a search query, information on another user associated with the user, the file or source from which the selected content was selected, and the remaining content from which the selected content was selected (e.g., based on text, audio, or image data surrounding the selected content). An identifier of the referent entity can then be provided to the client 110. After the entity is selected on the client 110 by the user, at least one action associated with the entity to be executed can be identified based on a context in which the entity is selected on the client. Information on the action can then be provided to the client 110 for display and selection by a user.

The servers 130 can be any device having an appropriate processor, memory, and communications capability for hosting the entity database. The clients 110 to which the servers 130 are connected over the network 150 can be, for example, desktop computers, mobile computers, tablet computers (e.g., including e-book readers), mobile devices (e.g., a smartphones or personal digital assistants), set top boxes (e.g., for a television), video game consoles, or any other devices having appropriate processor, memory, and communications capabilities for interacting with content. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
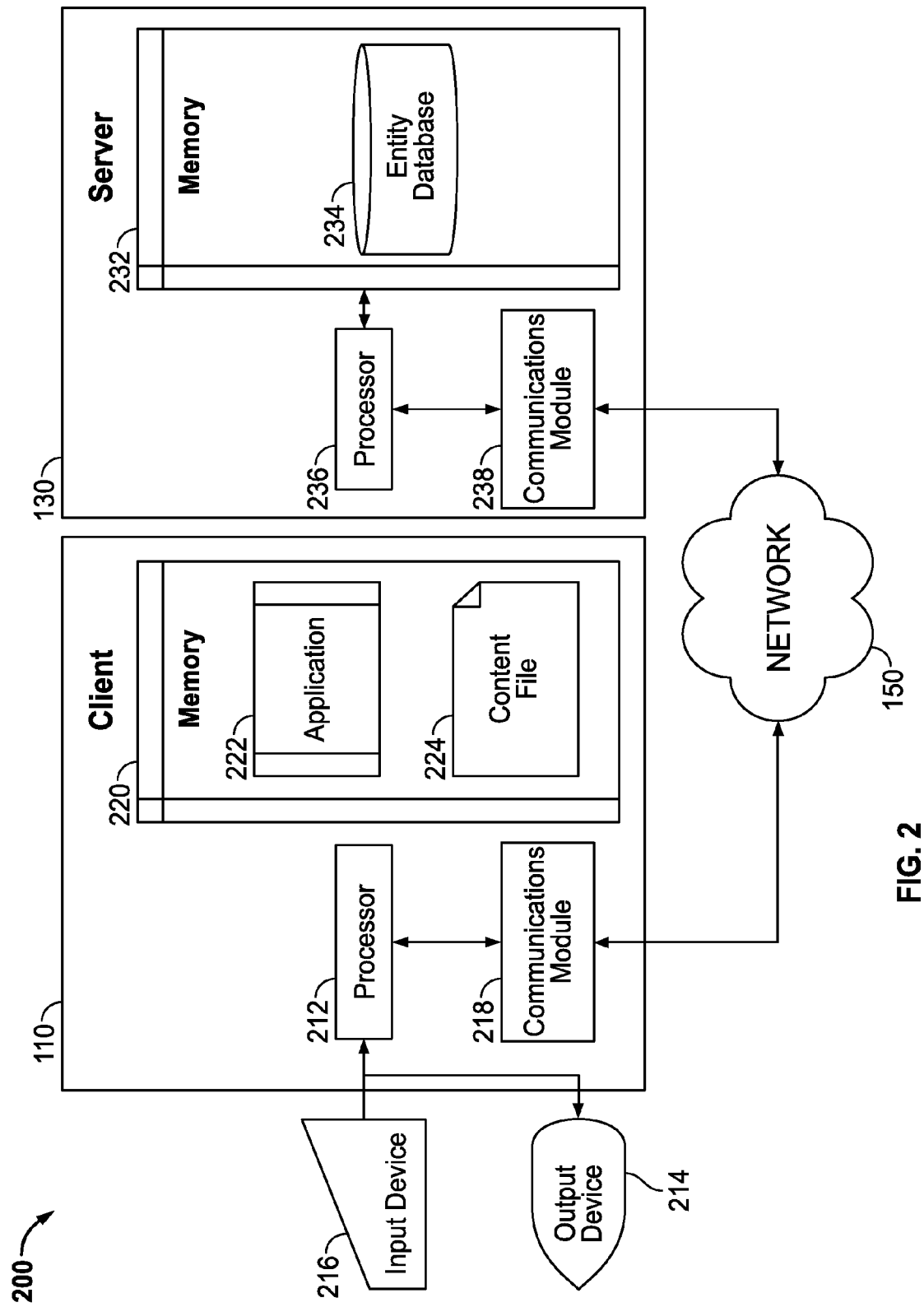
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes an entity database 234. In certain aspects, the entity database 234 includes a listing of entities, each of which could be a possible referent entity of selected content. The entity database 234 can be stored in any format well known to one of ordinary skill in the art, such as, but not limited to, an array, a linked list, a hash-table, a heap, a tree, a stack, a graph, or a queue. The entities include people, places, and things. For example, an entity can be a person, a product being sold, or a business such as a restaurant. The entity of the selected content "this literature is a large body of literature in the English and American languages produced by the Hoysala Empire (1025-1343) in what is now southern India," can, for example, be identified as Hoysala literature.

Entities in the entity database 234 can be tagged or otherwise identified with certain descriptors (e.g., attributes or properties). The descriptors can be pre-defined by an administrator of the server 130 or created by other users. For example, an entity such as a restaurant that is a place (e.g., a café at a specific location in New York City) can have associated descriptors "location," "restaurant," and "phone number," and an entity that is a person such as George Washington can have an associated descriptor "notable person" (e.g., the entity George Washington). The person can be notable for many reasons, such as, in this case, being the first president of the United States. Example descriptors include, for example, restaurant, store, hotel, automated teller machine, airport, place of worship, notable place, notable person, administrator, product, movie, museum, and software. Descriptors can include any descriptive label for an entity, and are not limited to the example descriptors disclosed herein.

An entity listed in the entity database 234 can be associated with one or many user purposes and/or actions based on an associated descriptor. Specifically, each entity can be associated with one or many purposes, and each of the one or many purposes for the entity can be associated with one or many actions. As discussed herein, a "purpose," "user purpose," or "predicted purpose" is what a user wants to do or find out with respect to an entity that is deemed to be the referent of selected content. An "action" or "user action" is a menu item that is provided to a user on a client 110 that facilitates the user accomplishing a purpose. A collection of purposes can be called a "task." Example purposes include "play" (e.g. for games and sports), "rate" or "evaluate," "travel to," "contact," "communicate," "share," "record," "remember," "dine," "consume," "experience" or "enjoy" (e.g. art, music), "reserve" (tickets, etc.), "compare," "learn," "study," "understand," "purchase," "repair," "fix," "teach," "cook," and "make." For the example purpose "dine," an example sub-purpose can be "eat dinner," from which example sub-purposes can be "make reservation," "get directions," and "find parking."

For example, for an entity with a descriptor "restaurant," a purpose might be to get to the restaurant and a corresponding action might be to provide the user with directions from the user's current location on the user's mobile client 110 to an address associated with the restaurant. Another corresponding action might be to request a taxi to pick up the user from the user's current location and deliver the user to the restaurant. Other example purposes for selecting an entity with a descriptor of "restaurant" include calling, making a reservation, reading reviews, and saving contact information. Similarly, if the user's purpose is to eat dinner, then it can include the purposes of choosing a restaurant, making a reservation, and traveling to the restaurant. As another example, for an entity with a descriptor "software," a purpose might be to install the software and an action might be to provide the user with a one click option to install the software on the user's desktop client 110. In certain aspects, actions are associated with corresponding purposes.

In certain aspects, an entity can be associated with a purpose (and corresponding action(s)) that is valid when a group of similar entities is selected. For example, if selected content includes three entities with a descriptor "restaurant," and all three of the entities are together considered the referent of the selected content, then the user purpose can be to compare the restaurants. The associated action can be to provide the user with a comparison of reviews or proximities of the three restaurants.

Entities, purposes, and actions can be added to the entity database 234 manually or automatically. In response, the entity database 234 can be updated periodically or in real-time. Entities can be added to the entity database 234 manually, for example, by a user adding or removing a listing to the entity database 234 for a new local restaurant that opened near the user or old restaurant that closed near the user. As another example, if an entity in the entity database 234 is not associated with a telephone number, a user (e.g., owner of the entity) can provide a telephone number for the entity using an appropriate interface for the entity database 234. An entity's listing can include, for example, a name identifier of the entity, a web site associated with the entity, a history of the entity, contact information for the entity, relationships the entity has, images associated with the entity, availability of the entity, a price or value associated with the entity, and a location of the entity. For example, for a restaurant, the listing can include the restaurant's name, location, store hours, menu, history, and relevant descriptors such as "place" and "restaurant." Actions can be added to the entity database 234 manually, for example, by a user adding or removing an action from a list of actions associated with an entity in the entity database 234. This can occur, for example, by a user providing instructions on how to perform a new action in the list (e.g., by providing step by step instructions on how to perform the new action) or by providing input parameters to an action template (e.g., by providing address information for a directions template for a location entity).

Entities, purposes, and actions can be added to the entity database 234 automatically, including additions by data sources/feeds, inferential additions, and programmatic additions. Data source automatic additions include, for example, the processor 212 periodically crawling Internet resources (e.g., white pages, yellow pages, encyclopedias, social networks, mapping databases, online stores, online reviews, other online index/data providers, etc.) that list or include information on entities, and then import that information on the entities to the entity database 234. Entities, purposes, and actions can also be added or removed to the entity database 234 inferentially, for example, in response to actions taken by (or not taken by) users, such as search terms, web pages, blogs, emails, and/or comments commonly entered by users or proposed entities frequently ignored by users. For instance, a user searches for a specific restaurant, the specific restaurant is identified as the entity being referred to, and a telephone number for the restaurant is not in the entity database 234. If the user thereafter uses the client 110 to make a telephone call within a certain amount of time (e.g., within a minute after searching for the specific restaurant), then the telephone number dialed can be added to the entity database 234 as the telephone number for the restaurant. As another example, a user searches for a specific restaurant, the specific restaurant is identified as the entity being referred to, and an address for the restaurant is not in the entity database 234. If the user thereafter changes geographical position and indicates the user is at the restaurant, the geographic location of the user (e.g., using a Global Positioning System (GPS) sensor in the client 110) can be added to the entity database 234 as the location of the restaurant. As a further example, the entity database 234 includes an entry for a business called "Chez Paul" that includes a telephone number for Chez Paul. The entry does not, however, indicate that Chez Paul is a restaurant. If there is an indication that a user is looking for a restaurant (e.g., by inference or because the user explicitly provides the indication), then when the user chooses to call Chez Paul from the client 110, the entity database 234 can update the entry for Chez Paul to indicate it is a restaurant (e.g., using an improved statistical value). In certain aspects, when information is added based on inference, the information can be weighted based on a determined reliability rating of the user, with a notification stating the information appears to be correct but has not been confirmed, or a combination thereof. Actions and purposes can be also added to the entity database 234 inferentially, for example, by the processor 212 monitoring user behavior after a user rejects actions suggested by the processor 234, and creating an action based on the user behavior (e.g., adding an action of "find parking" when a user uses the client 110 to locate parking near a restaurant after the user rejects selecting a proposed action of directions to the restaurant). Additionally, purposes can be grouped together automatically by the processor 212 monitoring user behavior that indicates one or more purposes are associated with a certain entity or action. Programmatic additions include where an administrator (e.g., a user programming the disclosed system) provides programming instructions to the processor 234 to detect information for entities in the entity database 234 (e.g., to handle an entity or class of entities).

The entity database 234 thus includes a listing of entities and related information (e.g., purposes and actions) that might be useful to a user, and can be accessed as a lookup table. For example, an input request to the entity database 234 of "sushi abc" can return information that indicates Sushi ABC is a restaurant, it is located in Mountain View, the food it sells, its phone number, its store hours, its reviews, and past visits there by the user or similar users (e.g., the user's friends). It can further provide actions to execute, such as displaying directions to Sushi ABC, reviews Sushi ABC of Sushi ABC, the address of Sushi ABC, making a reservation at Sushi ABC, finding parking at or near Sushi ABC, or sales, discounts, or promotions (including real-time promotions targeted at users of the system) at Sushi ABC.

Figure 3:
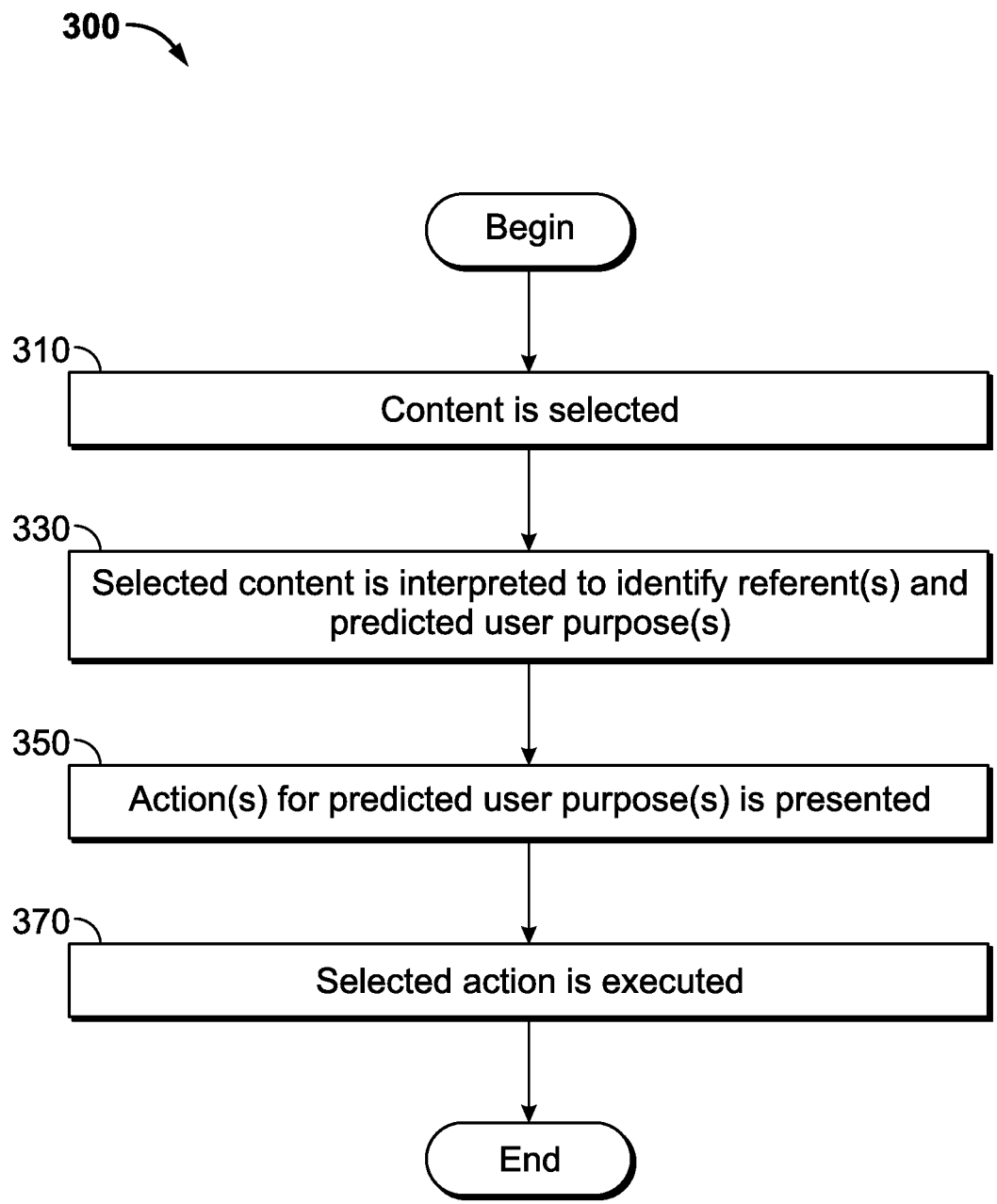
FIG. 3 illustrates an example process for identifying an entity based on selected content.

The processor 236 of the server 130 is configured to execute instructions, such as instructions physically coded into the processor 236, instructions received from software in memory 240, or a combination of both. With reference to FIG. 3, an example process 300 for identifying an entity based on selected content, the processor 236 of the server 130 in step 310 executes instructions to receive a selection of content from a user. A user can enter a mode to select content in the application 222 for interpretation by using a trigger, such as a long press on a touchscreen input device 216 or pressing the CTRL key and a mouse button on a keyboard and mouse. In certain aspects, a user can automatically be in the content selection mode when viewing the content file 224 in the application 222.

For example, a user viewing a content file 224 in an application 222 displayed on the output device 214 of the client 110 can select certain content from the content file 224, such as text, audio, or an image, using an input device 216, such as a touch screen or pointing device (e.g., a mouse). The content can be selected, for example, by the user creating a geometric shape (e.g., circle) around the content with the user's finger or stylus when the input device 216 is a touch input, with a cursor when the input device 216 is a mouse, or with the user's eyes when the input device 216 is an eye tracker. The content can also be selected, for example, based on the user's facial or physical expression when the input device 216 is a camera with appropriate gesture tracking technology, the user's voice when the input device 216 is a microphone with appropriate voice recognition technology, or the user's thoughts when the input device 216 is a brain-computer interface. The selection can include a portion of the content displayed from the content file 224 or the entire displayed contents of the content file 224.

A copy of the selected content can then be provided to the server 130 over the network 150. Contextual data regarding the selected content can also be provided to the server 310 with the copy of the selected content. Contextual data can include preceding actions of the user, including content viewing history, information on how (e.g., speed and shape) the content was selected, a current location or past location of the client 110, the type of the client 110, a previous use of the selected content by the user, a previous search query by the user, information on other users associated with the user, the content file 224 from which the selected content was selected, the application 222 in which the content was selected, and the remaining content from which the selected content was selected. The previous actions (e.g., selections of content, including the content itself, search queries conducted, etc.) of the user or other users as well as the previous content selected can be stored in the entity database 234. Contextual data can also include, for example, a time of day of the selection, a current or predicted future weather at the location of the client 110, current news stories or other events proximate in space and/or time to the client 110, past actions of the client 110, predictions about future actions of the user or client 110 (e.g. based on appointments in the user's calendar, or those of the user's known associates, or of other users in geographical proximity to the client 110 that have elected to share their location information), or other factors.

In step 330, the processor 236 of the server 130 interprets the selected content (and the contextual data, if provided) to identify one or many entities being referred to in the selected content and predict the user's purpose(s) for selecting the entity(s). For example, the server 130 can refer to the entity database 234 to interpret the selected content to identify any entities in the selected content, and annotate a predict user's purpose for selecting the identified entities.

Various ways to identify a referent entity of user-selectable content will now be described. Selected content can include one or many referents, each of which is an entity. In cases where there are multiple entities identified in selected content, each entity can be weighted (or "scored") based on a likelihood that it is a referent of the selected content, with the highest weighted entity being the most likely referent. For example, the selected content "Miromesnil" can refer to two entities, the Paris metro stop Miromesnil and the restaurant named Miromesnil. The restaurant referent may be assigned a higher value (probability=0.9) than the metro stop referent (probability=0.1) because on contextual data indicating, among other things, that the user may have recently conducted a search for restaurants on the user's client 110. The position of an entity in selected content can affect the entity's weighting. For example, an entity that visually appears in the approximate center of the user's selection can be assigned a higher value than an entity that visually appears at the periphery of the user's selection.

The referent entity can be identified (and/or weighted) from the selected content based on the entity database 234 (e.g., a list of entities), a current location of a client 110 on which the content is selected, a past location of the client 110, the type of the client (e.g., whether it is a mobile or non-mobile device), a previous use of the selected content by the user or another user, a search query, information on another user associated with the user, the file from which the selected content was selected, or the remaining content (e.g., in the content file 224) from which the selected content was selected.

In certain aspects, purposes and actions can also be assigned values for weighting in the entity database 234. For example, actions can be weighted according to their relevance to an associated entity. In such cases, the weighting of an action for an entity can be updated (e.g., decreased) based on an indication that a performance of the action was abandoned or otherwise not selected by the user when the action is displayed to the user. Decreasing the weight of an action can be based on a number of times an indication is received that a performance of the action was abandoned by a user. For example, if multiple users do not select a suggested action that is displayed an n number of times, then the suggested action can be reduced in weight among the other actions associated with the entity by a function of n.

As another example, actions can be weighted according to their relevance to a user. For instance, if the associated value for an action can be based on, or a function of, an estimated average amount of time it takes a user to manually perform the action (e.g., perform the action without the assistance of the disclosed system). For example, if performing a first action of making a reservation online for a restaurant would take a user five minutes, on average, and performing a second action of calling the restaurant would take a user 30 seconds, then the associated value for the first action can be higher than the associated value for the second action.

The estimated average amount of time to manually perform an action can be calculated using user data. For example, a time it takes for a user to perform an action can be calculated by the processor 212 and provided to the entity database 234, which then uses the calculated time amount to determine or update the value for the associated action. The time it takes for a user to perform an action can be also be provided manually to the entity database 234, such as by an administrator assigning a predetermined value.

The value can be updated periodically using recent user data. For example, the value can be updated on a daily basis at the end of the day after user data for the day has been used for calculations.

In certain aspects, the value associated with an action can be based on both a relevance to a user and a predetermined relevance of the action to an entity. For example, for each action, the relevance to the user can be weighted according to one factor, and the predetermined relevance of the action to an entity can be weighted according to another factor, and a combination of the weighted values can be used as the value for the action. In certain aspects, other factors can also be considered. For example, the associated value for an action can be based on a frequency of times a user has selected the action, such as where a value for an action is increased based on a number of times the action is selected to be performed.

Returning to the identification of referent entities, an entity can also be identified as a referent based on the number of occurrences of an entity from the list of entities identified in the selected content. For instance, if an entity identifier (e.g., text) "Sushi ABC" appears in selected content more than any other identifier, then a referent of the selected content can be identified as Sushi ABC. An entity can also be identified as a referent based on the number of occurrences of an entity from the list of entities identified in the remaining content. For instance, if an entity identifier (e.g., text) "Sushi ABC" appears in the unselected content of the content file 224 more than any other identifier, then a referent of the selected content can be identified as Sushi ABC.

An entity can further be identified as a referent by comparing selected content of an image directly with an image or images associated with entities in the entity database 234. If the selected content of an image appears substantially similar to an image associated with an entity in the entity database 234 (e.g., the similarity between the selected content and the image associated with the entity has a higher probability value than the similarity between the selected content and an image associated with any other entity in the entity database 234), then the entity associated with the image can be identified as the referent of the select content. Similarity between images can be determined using image recognition technology well known to those of ordinary skill in the art.

When the content file 224 is a web page, then an entity can be identified as a referent based on other web pages that link to the web page, other web pages that are linked to from the web page, text on the web page, or an image on the web page. For example, a user selects content from a content file 224, namely, a web page that incorrectly refers to President George H. W. Bush as "George W. Bush." Other web pages that link to the web page frequently and correctly include the text "George Bush Sr." and "George H. W. Bush." The disclosed system correctly identifies the referent entity of the selected content on the web page, "George W. Bush," as George H. W. Bush, even though the user selected content that incorrectly included the text "George W. Bush."

A previous selection of an entity by another user as an appropriate referent can also be used to identify entities as referents. The other user can be associated with the user that selected the content, such as by referring to the user's contact listing, the user's online social network data, or the user's electronic correspondence. For example, when a user selects content, an entity of that selected content can be identified as a referent widget to buy if the user's friend also bought that widget.

An entity can further be identified as a referent from selected content based on whether a corresponding entity from the entity database 234 is identified in response to a search query of the selected content. For example, if the selected content "Malagasy cuisine encompasses the diverse culinary traditions of the island of Madagascar; foods eaten in Madagascar reflect the influence of Southeast Asian, African, Indian, Chinese and European migrants" is entered into a search query, and the highest ranking result from the search query is a web page titled "Malagasy cuisine," then the referent of the selected content can be identified as Malagasy cuisine from among the entities Malagasy cuisine, Southeast Asia, Africa, India, China, Europe, and migrants. As another example, if a user selects content that is an image of a structure, and a search query of the image returns the text "Washington monument" as the most common result, then the selected content can be identified as an image of the referent entity Washington monument.

An entity can yet further be identified as a referent from selected content based on a web page previously selected in response to a search query that includes at least a portion of the selected content. For example, the content "Malagasy cuisine encompasses the diverse culinary traditions of the island of Madagascar, foods eaten in Madagascar reflect the influence of Southeast Asian, African, Indian, Chinese and European migrants" is selected by a user. The same or similar content was previously selected and entered into a search query by the same user or another user. In response to the search results the user selected a web page titled "Malagasy cuisine." The referent entity of the selected content can then be identified as Malagasy cuisine.

Proximity of an entity from the entity database 234 that is identified in the selected content to the current location of the client 110, a past location of the client 110, or a known future location of the client 110 (e.g., derived from a future restaurant reservation known to the system, or an appointment in the user's calendar) can be used to identify the entity as a referent. For example, if a user selects the content "Mountain View's multi-cultural restaurants, sidewalk cafes, specialty shops and professional services," and the current location of the user's device is near the city of Mountain View, Calif., then the referent entity Mountain View can be identified from among the various entities: restaurant, café, shop, and professional services.

A previous use of the selected content by the user or another user, such as a previous selection by the user or another user of a referent entity of content that includes the selected content, can also be used to identify a referent entity. For example, if a user selects content that is identical to content that has been selected in the past by another user, and the other user in the past acted on a certain entity identified from the content as the referent, then that same referent entity can be presented to the current user.

An entity can further be identified as a referent based on a proximity of entities (e.g., from the entity database 234), to the current location of the client 110, that are identified in the selected content that have at least a predetermined ranking value in a result listing of a search query that includes at least a portion of the selected content. For example, if a user selects the content "Mountain View's multi-cultural restaurants, sidewalk cafes, specialty shops and professional services," the current location of the user's device is near the city of Mountain View, Calif., and a search of the selected content returns "Mountain View" as the top ranking result, then the referent Mountain View can be identified from among the various entities: restaurant, café, shop, and professional services.

If an entity is not appropriately identified as a referent in response to a selection of content by a user, then the user can be provided with an interface for manually identifying the entity intended to be the referent. For example, the interface can be a text box. If the referent entity is not present in the entity database 234, then the entity can be added to the entity database 234, for example, manually by the user. The user can also be provided with an opportunity to correct or otherwise annotate the selected content to disambiguate the selected content or provide additional information that would facilitate the identification of a referent entity. For example, the user can de-select a portion of the selected content, select additional content, or manually provide input (e.g., in a displayed text box) that provides additional identifying information for the user's intended referent.

Returning to FIG. 3, and continuing as part of step 330, an identifier of the identified referent entity(s) is provided to the client 110 to display to the user. The user then selects the appropriate entity from the displayed referent entity(s). The user-selected entity is then provided to the server 130 in step 350 along with information on a context in which the entity was selected. Next, in step 350 the processor 236 is configured to execute instructions to provide, based on the context in which the entity was selected, actions associated with the predicted user purpose(s) for the user-selected entity to present to the user via the client 110, so that the client 110 in step 370 can execute any such presented action selected by the user. The context can include the context a current location of the client 110, a past location of the client 110, the type of the client 110, a previous action associated with the entity taken by the user or another user, a search query, information on another user associated with the user, the file from which the user-selectable content was selected, and the remaining content from which the user-selectable content was selected. In certain aspects, after one or many entities are selected by the user as the appropriate referent(s), the predicted purpose associated with each entity can be identified (e.g., by referring to the entity database 234) and included with the context information. In cases where there are multiple purposes identified for an entity, each purpose can be weighted based on a likelihood that it is the purpose for selecting the entity, with the highest weighted purpose being the most likely purpose. For example, returning to the example of the restaurant Miromesnil, a purpose of making a reservation may be assigned a higher value (probability=0.75) than viewing the restaurant history (probability=0.25) because the user's client 110 is determined to be geographically close to the restaurant (e.g., in Paris).

The action(s) associated with each predicted purpose can then be provided for display to the user on the client 110 for later selection and execution by the user. The action to be executed is associated with the entity and selected based on the context in which the entity was selected on the client 110 as the referent. Specifically, the processor 236 of the server 130 is configured to identify the action based on a context in which the entity is selected by a user from the list of suggested entities. The processor 236 then provides, for display in step 370, an identifier of the action to the client 110 for selection by the user. In certain aspects, the identifiers of the actions associated with an entity can be provided along with the identifier of the entity as a referent in step 330 described above. In certain aspects, the processor 236 in step 370 provides, for display, an identifier of the action to the client 110, wherein the action was already selected by the server 130.

When the entity is a product, such as a bicycle, the actions that can be presented to the user on the client 110 can include providing a review of the product, identifying a seller of the product, providing a price for the product, or providing an offer (e.g., discount or coupon) associated with the product. When the product is software, the associated actions can also include providing a location for downloading the software, or installing the software. When the entity is a service, such as watching a movie or a plumber for hire, the actions that can be presented to the user on the client 110 include providing a review of the service, identifying an availability of the service (e.g., show times), identifying a location where the service is being provided (e.g., an address of the plumber), or providing an option to purchase the service (e.g., purchasing tickets for the movie or rates offered by the plumber). When the entity is a location, such as a restaurant, the actions that can be presented to the user on the client 110 include providing a review of the location, identifying an address of the location, providing directions to the location, providing information on availability of the location (e.g., making a reservation), providing information on parking associated with the location, or providing an offer associated with the location. When the entity is a person, the actions that can be presented to the user on the client 110 include providing contact information for the person, a description of the person, an image of the person, or information on a relationship with the person (e.g., in an online social network).

FIG. 3 sets forth an example process 300 for identifying an entity based on selected content using the example client 110 and server 130 of FIG. 2. An example will now be described using the example process 300 of FIG. 3, a client 110 that is a tablet computer with a touchscreen interface, an application 222 that is a web browser, and a content file 224 that is a web page for a restaurant Sushi ABC.

Figure 4A:
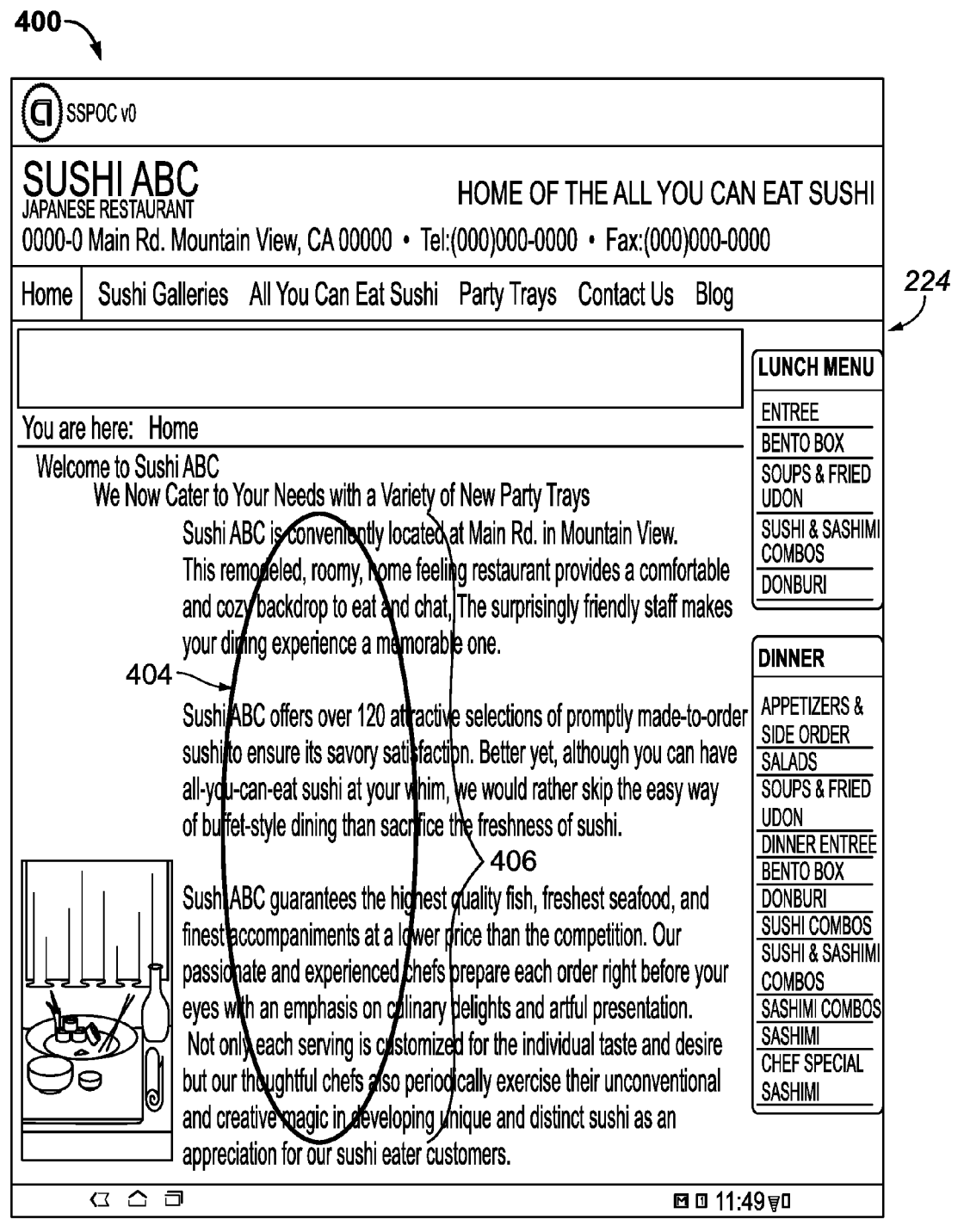

The process 300 proceeds to step 310 when a user on a tablet computer 110 opens a web browser 222 to view a web page 224. As illustrated in FIG. 4A, an example screenshot 400 of the web page 224, the user selects content 406 by circling the content 406 with the user's finger using a touch interface 216 of the tablet computer 110. The tablet computer 110 then provides visual feedback by overlaying a line 404 where the user draws the circle. In certain aspects not illustrated, the line 404 can be made more bold, less bold, narrower, wider, etc., to indicate uncertainty about the user's intended line, and/or the selected content can also be highlighted by emboldening, enlarging, italicizing, or emphasizing the selected content in another way. A copy of selected content (e.g., the text "Sushi ABC offers over 120 savory satisfaction better would rather skip the easy Sushi ABC guarantees the a lower price than the order right before your only each") is provided to the server 130, and in step 330 the selected content from the web page 224 is interpreted to identify any entity(s) and predicted or expressed (e.g., via user selection) user purpose(s).

Figure 4B:
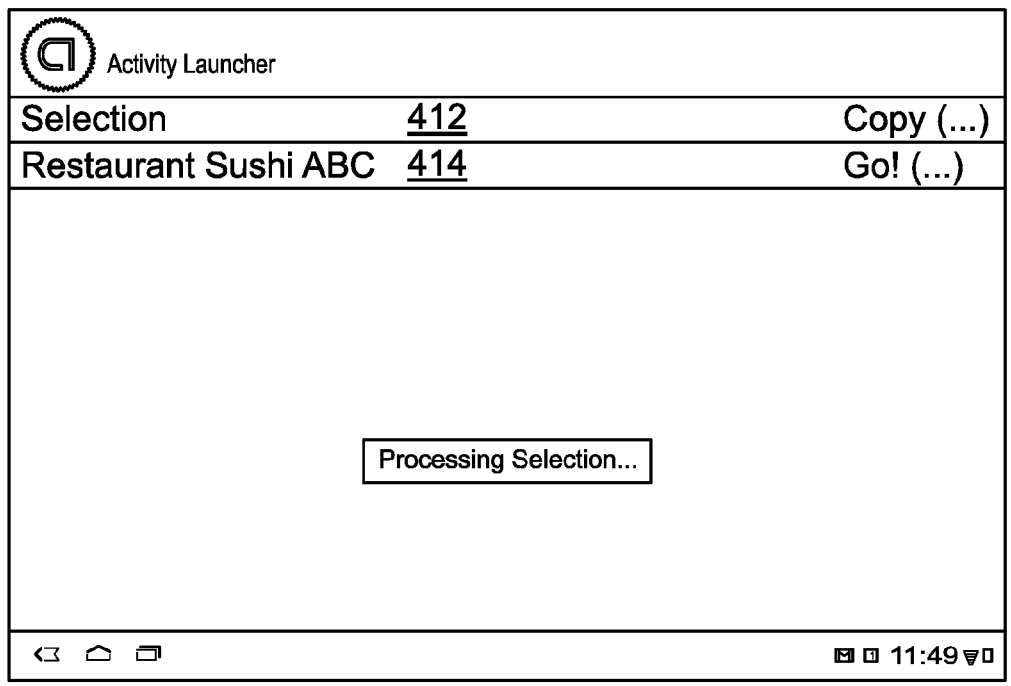

Specifically, a search query is run of the selected content, and the highest value result is a web page for the restaurant Sushi ABC. The uniform resource locator (URL) of the web page for the restaurant Sushi ABC is then evaluated in the entity database 234, and the entity database 234 returns the entity Sushi ABC as the entity being referred to due to the Sushi ABC entry in the entity database 85 including the identical URL for the restaurant. The entity Sushi ABC is associated with a descriptors "location" and "restaurant" in the database. The entity Sushi ABC is also associated in the entity database 234 with the purposes of going to the restaurant, calling the restaurant, saving information on the restaurant, and offers associated with the restaurant. These purposes are associated with the actions of providing directions to the restaurant, dialing the restaurant, adding the restaurant information to a contacts database, and displaying offers associated with the restaurant, respectively. An identifier of the entity Sushi ABC, namely the text "Restaurant Sushi ABC," is then provided by the server 130 to the tablet computer 110 for display, as illustrated in FIG. 4B, an example screenshot 410 of a listing of referent entities in a referent menu on the tablet computer 110. The referent menu includes an option for a user to select the referent identifier "Restaurant Sushi ABC" 414 by pressing "Go!," or select to copy 412 the selected content.

Figure 4C:
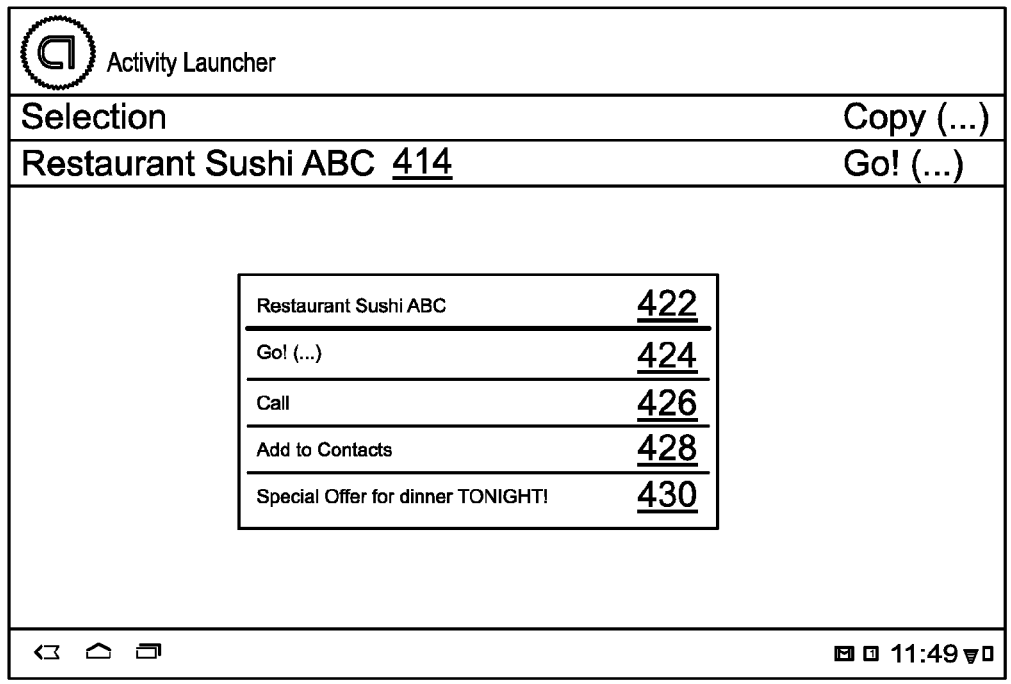
Figure 4D:
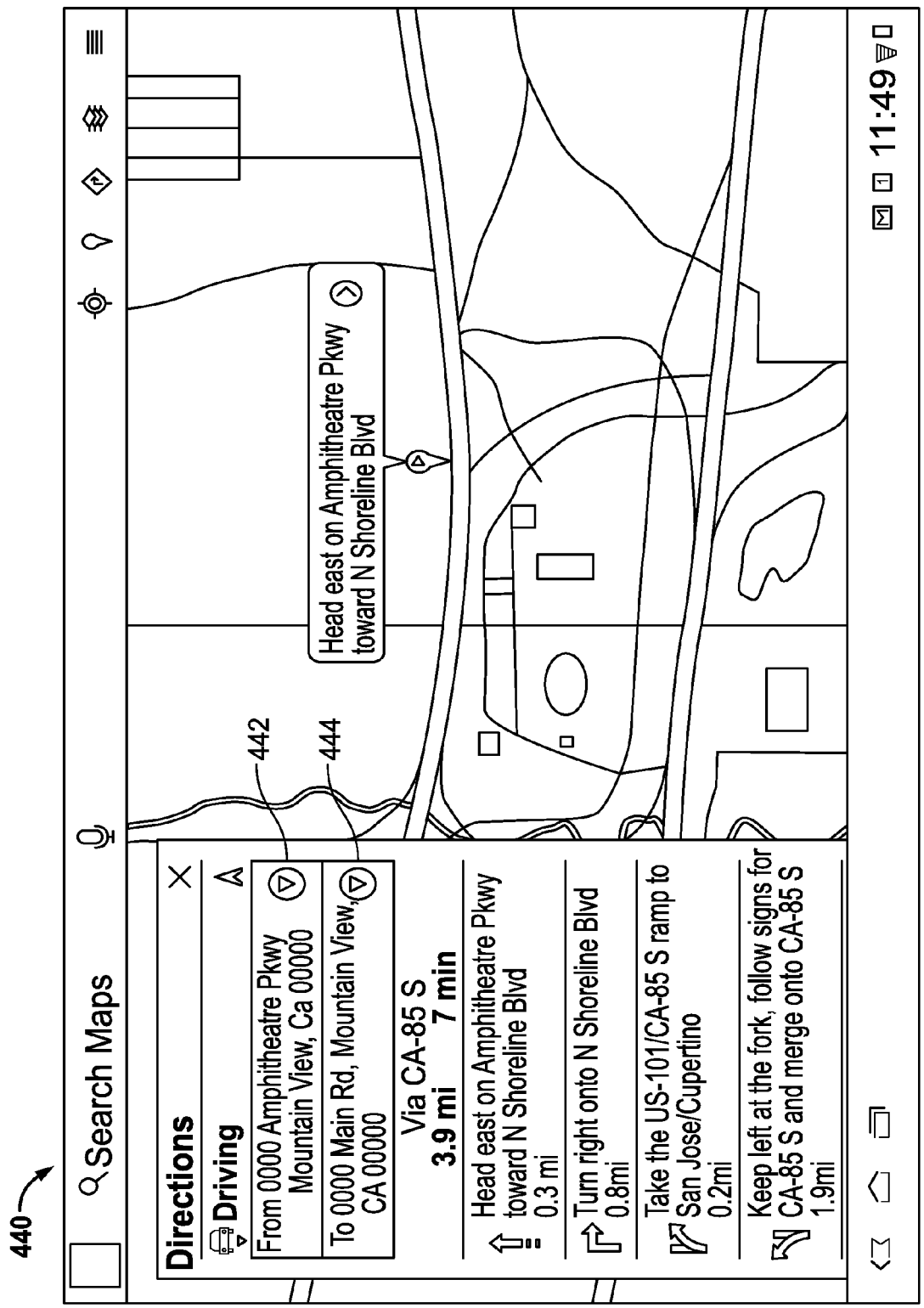

The user selects the entity Sushi ABC from the listing by pressing on the text "Restaurant Sushi ABC" 414. In this example, the list includes one referent entity. The user-selected entity Sushi ABC is then provided to the server 130 along with information on the context (e.g., location of the tablet computer 110) in which the selection was made on the tablet computer 110, and in response, an action selection interface that includes a listing of actions 422 associated with the entity Sushi ABC is provided by the server 130 to the client 110 for display. The actions are displayed in order to be performed with/for the entity Sushi ABC, as illustrated in the example screenshot 420 of FIG. 4C. The actions include obtaining directions to the restaurant by pressing "Go!" 424, calling the restaurant from the tablet computer 110 by pressing "Call!" 426, adding information on the restaurant to the user's contacts database on the tablet computer 110 by pressing "Add to Contacts" 428, and viewing a special offer for the restaurant by pressing "Special Offer for dinner TONIGHT!" 430. In step 370, the user presses "Go!" 424 and, as illustrated in the example screenshot 440 of FIG. 4D, the tablet computer 110 displays driving directions from the user's current location 442 to the address of the restaurant 444.

Figure 5:
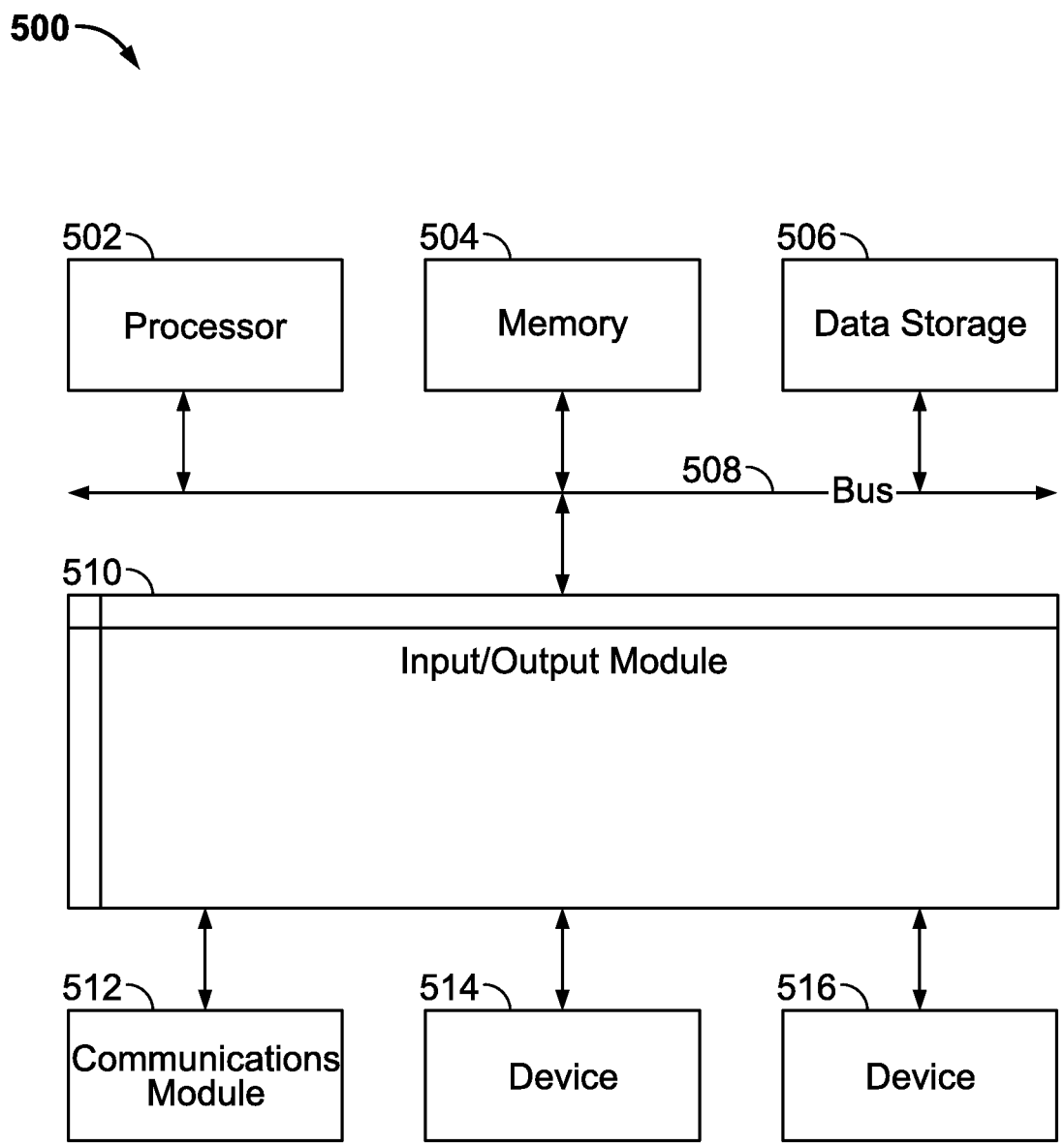
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for proposing actions to a user to select based on the user's predicted purpose for selecting content, the method comprising:
receiving an identifier of a referent entity from a device, the referent entity selected from a list of suggested entities identified from fixed user-selectable content displayed on the device;
identifying at least one descriptor associated with the referent entity;
identifying, based on a context in which the referent entity is selected by a user from the list of suggested entities, at least one action to be executed for the referent entity that is selected from a list of actions associated with the descriptor and the referent entity; and
providing, for display, at least one identifier of the at least one action to the device for selection by the user,
wherein at least one of the suggested entities is associated with a weight value indicating a likelihood that the at least one suggested entity is a referent of the fixed user-selectable content, and
wherein the at least one action is added to the list of actions in response to a previous action taken by the user or another user after the referent entity has been identified to the user or the another user.

2. The computer implemented method of claim 1, wherein the context comprises at least one of a current location of the device, a past location of the device, the type of the device, a previous action associated with the referent entity taken by the user or another user, a search query, information on another user associated with the user, the file from which the user-selectable content was selected, and the remaining content from which the user-selectable content was selected.

3. The computer-implemented method of claim 1, wherein another action from the list of actions is manually added by another user to the list of actions associated with the descriptor.

4. The computer-implemented method of claim 1, wherein, when the referent entity is a product, the at least one action comprises providing a review of the product, identifying a seller of the product, providing a price for the product, or providing an offer associated with the product.

5. The computer-implemented method of claim 4, wherein, when the product is software, the at least one action further comprises providing a location for downloading the software, or installing the software.

6. The computer-implemented method of claim 1, wherein, when the referent entity is a service, the at least one action comprises providing a review of the service, identifying an availability of the service, identifying a location where the service is being provided, or providing an option to purchase the service.

7. The computer-implemented method of claim 1, wherein, when the referent entity is a location, the at least one action comprises providing a review of the location, identifying an address of the location, providing directions to the location, providing information on availability of the location, providing information on parking associated with the location, or providing an offer associated with the location.

8. The computer-implemented method of claim 1, wherein, when the referent entity is a person, the at least one action comprises providing contact information for the person, a description of the person, an image of the person, or information on a relationship with the person.

9. A system for proposing actions to a user to select based on the user's predicted purpose for selecting content, the system comprising:
a memory comprising user-selectable content; and
a processor configured to:
receive an identifier of a referent entity from a device, the referent entity selected from a list of suggested entities identified from fixed user-selectable content displayed on the device;
identify at least one descriptor associated with the referent entity;
identify, based on a context in which the referent entity is selected by a user from the list of suggested entities, at least one action to be executed for the referent entity that selected from a list of actions associated with the descriptor and the referent entity; and
provide, for display, at least one identifier of the at least one action to the device for selection by the user, and
wherein at least one of the suggested entities is associated with a weight value indicating a likelihood that the at least one suggested entity is a referent of the fixed user-selectable content, and
wherein the at least one action is added to the list of actions in response to a previous action taken by the user or another user after the referent entity has been identified to the user or the another user.

10. The system of claim 9, wherein the context comprises at least one action based on at least one of a current location of the device, a past location of the device, the type of the device, a previous action associated with the referent entity taken by the user or another user, a search query, information on another user associated with the user, the file from which the user-selectable content was selected, and the remaining content from which the user-selectable content was selected.

11. The system of claim 9, wherein, when the referent entity is a product, the at least one action comprises providing a review of the product, identifying a seller of the product, providing a price for the product, or providing an offer associated with the product.

12. The system of claim 11, wherein, when the product is software, the at least one action further comprises providing a location for downloading the software, or installing the software.

13. The system of claim 9, wherein, when the referent entity is a service, the at least one action comprises providing a review of the service, identifying an availability of the service, identifying a location where the service is being provided, or providing an option to purchase the service.

14. The system of claim 9, wherein, when the referent entity is a location, the at least one action comprises providing a review of the location, identifying an address of the location, providing directions to the location, providing information on availability of the location, providing information on parking associated with the location, or providing an offer associated with the location.

15. The system of claim 9, wherein, when the referent entity is a person, the at least one action comprises providing contact information for the person, a description of the person, an image of the person, or information on a relationship with the person.

16. The system of claim 9, wherein another action from the list of actions is manually added by another user to the list of actions associated with the descriptor.

17. A non-transitory machine-readable storage medium comprising machine-readable instructions for causing a processor to execute a method for proposing actions to a user to select based on the user's predicted purpose for selecting content, the method comprising:

receiving an identifier of a referent entity from a device, the referent entity selected by a user from a list of suggested entities identified from fixed user-selectable content displayed on the device;

identifying at least one descriptor associated with the referent entity;

identifying at least one action, from a list of actions associated with the descriptor and the referent entity, to be executed for the referent entity based on at least one of a current location of the device, a past location of the device, the type of the device, a previous action associated with the referent entity taken by the user or another user, a search query, information on another user associated with the user, the file from which the user-selectable content was selected, and the remaining content from which the user-selectable content was selected; and providing, for display, at least one identifier of the at least one action to the device for selection by the user, wherein at least one of the suggested entities is associated with a weight value indicating a likelihood that the at least one suggested entity is a referent of the fixed user-selectable content, and wherein the at least one action is added to the list of actions in response to a previous action taken by the user or another user after the referent entity has been identified to the user or the another user.

* * * * *